United States Patent [19]

Kawanabe et al.

[11] Patent Number: 5,003,147
[45] Date of Patent: Mar. 26, 1991

[54] METHOD OF MEASURING WIRE GUIDE SPANS AND DIRECTING WIRE ELECTRODE PERPENDICULARLY TO REFERENCE MACHINING PLANE IN ELECTRICAL-DISCHARGE WIRE CUTTING MACHINE

[75] Inventors: Tasuku Kawanabe, Nagoya; Masayuki Momonoi, Tsushima, both of Japan

[73] Assignee: Brother Kogyo Kabushiki Kaisha, Japan

[21] Appl. No.: 521,433

[22] Filed: May 10, 1990

[30] Foreign Application Priority Data

May 12, 1989 [JP] Japan .................................. 1-119923
Oct. 3, 1989 [JP] Japan .................................. 1-258034

[51] Int. Cl.$^5$ .............................................. B23H 7/06
[52] U.S. Cl. ................................. 219/69.12; 219/69.17
[58] Field of Search ................ 219/69.17, 69.12, 69.13

[56] References Cited

U.S. PATENT DOCUMENTS 4,673,788 6/1987 Buchler ............................ 219/69.12
4,931,614 6/1990 Sumita ............................ 219/69.12

FOREIGN PATENT DOCUMENTS 54-104099 8/1979 Japan .
139617 6/1988 Japan ............................. 219/69.12
1-103229 4/1989 Japan .

Primary Examiner—Geoffrey S. Evans
Attorney, Agent, or Firm—Oliff & Berridge

[57] ABSTRACT

An electrical-discharge wire cutting machine has upper and lower wire guides by which a wire electrode is guided under tension. The perpendicularity of the wire electrode to a reference machining plane is detected by a wire electrode perpendicularity gage which is supported on a workpiece table and which has upper and lower detectors. The upper wire guide, which is movable, is positioned successively in four positions, and the workpiece table is moved each time the upper wire guide is positioned in one of the four positions. Positions in which the detectors contact the wire electrode are determined when the upper wire electrode is positioned in the respective four positions. Wire guide spans, or distances between the wire guides and the nearby detectors, are computed on the basis of the positions in which the upper wire guide is positioned, the positions in which the wire electrode is contacted by the detectors, and the distance between upper and lower ends of the detectors. The moving distance which the upper wire guide has to traverse in order to orient the wire electrode perpendicularly to the reference machining plane is computed on the basis of the computed wire guide spans, and the other positional data.

8 Claims, 6 Drawing Sheets

METHOD OF MEASURING WIRE GUIDE SPANS AND DIRECTING WIRE ELECTRODE PERPENDICULARLY TO REFERENCE MACHINING PLANE IN ELECTRICAL-DISCHARGE WIRE CUTTING MACHINE

BACKGROUND OF THE INVENTION

The present invention relates to an electrical-discharge wire cutting machine, and more particularly to a method of quickly and accurately positioning wire guides so that a wire electrode guided by the wire guides will be directed perpendicularly to a plane in which a workpiece moves, and a method of obtaining data on the exact span or distance between the wire guides which is required for subsequent tapered surface machining.

Electrical-discharge wire cutting requires a wire electrode to be directed perpendicularly to a reference machining plane, i.e., a plane in which a workpiece moves. The perpendicularity of the wire electrode to the reference machining plane is highly important since it directly affects the accuracy of machining. Another important element required by electrical-discharge wire cutting is the accurate measurement of a span or distance between upper and lower wire guides by which the wire electrode is guided. The data on the accurately measured wire guide span are required for accurate tapered surface machining.

There are known two typical methods of directing a wire electrode perpendicularly to a reference machining plane. One method is disclosed in Japanese Patent Application (Kokai) No. 54(1979)-104099. The disclosed method is carried out with respect to an electrical-discharge wire cutting machine which includes a workpiece table movable along an X-axis and a Y-axis that extend perpendicularly to each other, and a moving unit for moving one of upper and lower wire guides parallel to the X-axis and the Y-axis. On the workpiece table, there is mounted a wire electrode perpendicularity gage having first and second detecting surfaces. The first detecting surface is directed normal to the X-axis and is composed of upper and lower detectors. The second detecting surface is directed normal to the Y-axis and is composed of upper and lower detectors. In operation, the workpiece table is moved in one direction along the X-axis until one of the upper and lower detectors of the first detecting surface contacts a wire electrode. When the contact between one of the detectors and the wire electrode is detected, said one of the upper and lower wire guides is moved by a predetermined small distance parallel to the X-axis in a direction away from the detector which was contacted by the wire electrode or in a direction toward the detector which was not contacted by the wire electrode, depending on whether the wire electrode contacted the upper or lower detector. The above process is repeatedly carried out until the upper and lower detectors simultaneously contact the wire electrode. Then, the same operation as above is effected with respect to the second detecting surface and the Y-axis, thereby holding the wire electrode perpendicularly to the reference machining plane.

The other method is disclosed in Japanese Patent Application (Kokai) No.1(1989)-103229. This method is carried out with respect to the same electrical-discharge wire cutting machine as described above. One of the wire guides is moved parallel to the X-axis in order to tilt the wire electrode. The workpiece table is then moved in one direction along the X-axis until one of the upper and lower detectors of the wire electrode perpendicular gage contacts the wire electrode. Thereafter, the workpiece table is moved by a distance (d) in a direction to displace the wire electrode perpendicularity gage away from the wire electrode, and then said one wire guide is moved by a distance (e) parallel to the X-axis in a direction to displace the wire electrode guided by that wire guide further away from the wire electrode perpendicularity gage. Next, the workpiece table is moved by a distance (f) in one direction parallel to the X-axis until the other detector of the wire electrode perpendicularity gage contacts the wire electrode. Based on the above moving distances d, e and f, values inherent in the machine which have been inputted as distances a and b between the wire guides and detectors close thereto, and a previously measured distance W between the upper and lower detectors, computed is the distance required for the first-moved wire guide to move for bringing the wire electrode perpendicularly to the reference machining plane. (The terms used in the above description of the prior art are not in conformity with the terminology used in the above publications, but are the same as those used in the present invention for easier comparison between the prior art and the present invention. However, the symbols remain the same as those found in the publications.)

According to the former method, the wire guides are repeatedly moved by small distances until the upper and lower detectors simultaneously contact the wire electrode. Therefore, a long period of time is needed to bring the wire electrode perpendicularly to the reference machining plane, and hence low working efficiency and low productivity result.

According to the latter method, the distance required for the first-moved wire guide to move for directing the wire electrode perpendicularly to the reference machining plane is computed using the previously measured distance W between the upper and lower detectors and the inherent values which have been input as the distances a, b between the wire guides and detectors close thereto.

In ordinary electrical-discharge wire cutting machines, the upper and lower wire guides are consumed very rapidly, and need to be replaced each time the machine has operated over a certain period of time. When the wire guides are replaced, the distances a, b slightly vary because of shape and dimensional irregularities of the wire guides. Therefore, the above method which uses the inherent values which have been inputted as the distances a, b cannot direct the wire electrode exactly perpendicularly to the reference machining plane when the wire guides are replaced. Further, this conventional process which has been proposed to measure the accurate values a, b is self-contradictory and is not practical, since these values are measured after the entire method of directing the wire electrode perpendicularly to the reference machining surface is presumed to be completed.

SUMMARY OF THE INVENTION

In view of the aforesaid problems of the prior art, it is an object of the present invention to provide a method of simply and accurately computing distances a, b between upper and lower wire guides and a wire electrode perpendicularity gage.

Another object of the present invention is to provide a method for accurately directing a wire electrode perpendicularly to a reference machining plane within a short period of time using positional data which are obtained for the computation of the distances a, b.

Still another object of the invention is to provide a method for utilizing the values of the distances a, b in case of the computation for subsequent machining, especially tapered surface machining.

These and other objects of this invention will be attained by providing a method of measuring wire guide spans in an electrical-discharge wire cutting machine having a workpiece table movable in a reference machining plane, for supporting a workpiece fixedly thereon, two wire guides disposed upwardly and downwardly, respectively, of the workpiece, a wire electrode extending between and guided by the wire guides, for machining the workpiece, a workpiece drive mechanism for moving the workpiece table along X and Y axes which are perpendicular to each other, with respect to the wire electrode, a wire guide drive mechanism for moving one of the wire guides along a U axis parallel to the X axis and a V axis parallel to the Y axis, a wire electrode perpendicularity gage fixedly mounted on the workpiece table and having two detecting surfaces lying perpendicularly to each other, and detecting means for detecting contact between the detecting surfaces and the wire electrode, the method comprising the steps of moving one wire guide in a direction along one of the U axis and the V axis with the wire guide drive mechanism to position the one wire guide successively in first two positions u2, u3, one on each side of a plane which includes a line uv - 0 passing through the other wire guide and normal to the reference machine plane and which is perpendicular to the direction, and also to position the one wire guide successively in second two positions u1, u4 which are outward of the positions u2, u3 with respect to the plane, moving the workpiece table along one of the X axis and the Y axis which extends parallel to the direction, with the workpiece drive mechanism, each time the one wire guide is positioned in one of the positions u1, u2, u3, u4, to determine positions x1, x2, x3, x4 in which the detecting surfaces of the wire electrode perpendicularity gage contact the wire electrode when the one wire guide is positioned in the respective positions u1, u2, u3, u4, determining a distance U1 between the positions u1 and u2, a distance U3 between the positions u3 and u4, a distance X1 between the positions x1 and x2, and a distance X3 between the positions x3 and x4, and computing a distance a between the one wire guide and an end of the detecting surface which is closer to the one wire guide and a distance b between the other wire guide and an end of the detecting surface which is closer to the other wire guide, based on the determined distances U1, U3, X1, X3 and a measured distance h between the ends of the detecting surfaces.

As a modification to the method described above, the above described steps are carried out firstly with respect to the U-axis and X-axis, and then with respect to the V-axis and Y-axis, for respectively obtaining distances a and b. Then, conducted are steps of determining arithmetic means of the computed distances a, b with respect to both the U- and V-axes, and using the arithmetic means as the wire guide spans.

In another aspect of this invention, there is provided a method of directing a wire electrode perpendicularly to a reference machining plane in an electrical-discharge wire cutting machine having a workpiece table movable in the reference machining plane, for supporting a workpiece fixedly thereon, two wire guides disposed upwardly and downwardly, respectively, of the workpiece, a wire electrode extending between and guided by the wire guides, for machining the workpiece, a workpiece drive mechanism for moving the workpiece table along X and Y axes which are perpendicular to each other, with respect to the wire electrode, a wire guide drive mechanism for moving one of the wire guides along a U axis parallel to the X axis and a V axis parallel to the Y axis, the one wire guide being positionally adjustable perpendicularly to a plane in which the one wire guide is movable along the U axis and the V axis, a wire electrode perpendicularity gage fixedly mounted on the workpiece table and having two detecting surfaces lying perpendicularly to each other, and detecting means for detecting contact between the detecting surfaces and the wire electrode, the method comprising the steps of moving the one wire guide in a direction along one of the U axis and the V axis with the wire guide drive mechanism to position the one wire guide successively in first two positions u2, u3, one on each side of a plane which includes a line uv - O passing through the other wire guide and normal to the reference machine plane and which is perpendicular to the direction, and also to position the wire guide in second two positions u1, u4 which are outward of the positions u2, u3, with respect to the plane, while holding the one wire guide in a vertically adjusted position, moving the workpiece table along one of the X axis and the Y axis which extends parallel to the direction, with the workpiece drive mechanism, each time the one wire guide is positioned in one of the positions u1, u2, u3, u4, to determine positions x1, x2, x3, x4 in which the detecting surfaces of the wire electrode perpendicularity gage contact the wire electrode when the one wire guide is positioned in the respective positions u1, u2, u3, u4, computing a distance a between the one wire guide and an end of the detecting surface which is closer to the one wire guide and a distance b between the other wire guide and an end of the detecting surface which is closer to the other wire guide, based on a distance U1 between the positions u1 and u2, a distance U3 between the positions u3 and u4, a distance X1 between the positions x1 and x2, a distance X3 between the positions x3 and x4, and a measured distance h between the ends of the detecting surfaces, thereafter computing either a distance ti from one ui of the positions u1, u2, u3, u4 to the plane including the line uv - O, or a distance $tj = (Ui - ti)$ from another position uj, which is spaced from the one position ui across the plane by a distance Ui, to the plane, based on the distances a, b, h and one Xi of the distances between the positions x1, x2, x3, x4 which corresponds to the distance Ui, controlling the wire guide drive mechanism based on the computed distance ti or tj to orient the wire electrode perpendicularly to the reference machining plane with respect to the one of the U axis and the V axis, moving the one wire guide in a direction along the other of the V axis and the U axis with the wire guide drive mechanism to position the one wire guide successively in first two positions u2, u3, one on each side of a plane which includes a line uv - O passing through the other wire guide and normal to the reference machine plane and which is perpendicular to the direction, and also to position the wire guide in second two positions u1, u4 which are outward of the positions u2, u3, with respect to the plane, while holding the one wire guide in a vertically adjusted position, moving the workpiece table along the other of the Y axis and the X axis which extends parallel to the direction, with the workpiece drive mechanism, each time the one wire guide is positioned in one of the positions u1, u2, u3, u4, to determine positions x1, x2, x3, x4 in which the detecting surfaces of the wire electrode perpendicularity gage contact the wire electrode when the one wire guide is positioned in the respective positions u1, u2, u3, u4, computing a distance a between the one wire guide and an end of the detecting surface which is closer to the one wire guide and a distance b between the other wire guide and an end of the detecting surface which is closer to the other wire guide, based on a distance U1 between the positions u1 and u2, a distance U3 between the positions u3 and u4, a distance X1 between the positions x1 and x3, a distance X3 between the positions x3 and x4, and a measured distance h between the ends of the detecting surfaces, thereafter computing either a distance ti from one ui of the positions u1, u2, u3, u4 to the plane including the line uv - O, or a distance tj=(Ui−ti) from another position uj, which is spaced from the one positions ui across the plane by a distance Ui, to the plane, based on the distances a, b, h and one Xi of the distances between the positions x1, x2, x3, x4 which corresponds to the distance Ui, and controlling the wire guide drive mechanism based on the computed distance ti or tj to orient the wire electrode perpendicularly to the reference machining plane with respect to the other of the V axis and the U axis. All of the steps are repeated at least twice.

As a modification to the method of directing a wire electrode perpendicularly to a reference machining plane in an electrical discharge wire cutting machine, after the wire electrode is oriented perpendicularly to the reference machining plane with respect to both the U- and the V-axes, there are provided steps of determining arithmetic means of the last computed distances a, b with respect to both the U- and V-axes, and using the arithmetic means as data for a subsequent machining process.

In a still another aspect of the present invention, there is provided a method of directing wire electrode perpendicularly to a reference machining plane in an electrical-discharge wire cutting machine having a workpiece table movable in the reference machining plane, for supporting a workpiece fixedly thereon, two wire guides disposed upwardly and downwardly, respectively, of the workpiece, a wire electrode extending between and guided by the wire guides, for machining the workpiece, a workpiece driving mechanism for moving the workpiece table along X and Y axes which are perpendicular to each other, with respect to the wire electrode, a wire guide drive mechanism for moving one of the wire guides along a U axis parallel to the X axis and a V axis parallel to the Y axis, the one wire guide being positionally adjustable perpendicularly to a plane in which the one wire guide is movable along the U axis and the V axis, a wire electrode perpendicularity gage fixedly mounted on the workpiece table and having two detecting surfaces lying perpendicularly to each other, and detecting means for detecting contact between the detecting surfaces and the wire electrode, the method comprising the steps of moving the one wire guide in a direction along one of the U axis and the V axis with the wire guide drive mechanism to position the one wire guide in a first position u1 spaced away from a plane which includes a line uv - O passing through the other wire guide and directing normal to the reference machine plane and which is perpendicular to the direction, while holding the one wire guide in a vertically adjusted position, moving the workpiece table along one of the X axis and the Y axis which extends parallel to the direction, with the workpiece drive mechanism, to determine, with the detecting means, a first position x1 in which the detecting surfaces of the wire electrode perpendicularity gage contact the wire electrode when the one wire guide is positioned in the first position u1, moving the one wire guide in the direction with the wire guide drive mechanism to position the one wire guide in a second position u2 which is closer to the plane than the first position u1, moving the workpiece table along the one of the X axis and the Y axis with the workpiece drive mechanism to determine, with the detecting means, a second position x2 in which the detecting surfaces of the wire electrode perpendicularity gage contact the wire electrode when the one wire guide is positioned in the second position u2, positioning the one wire guide in a third position u3 which is spaced from the plane on a side thereof opposite to the second position u2, moving the workpiece table along the one of the X axis and the Y axis, with the workpiece drive mechanism, to determine, with the detecting means, a third position x3 in which the detecting surfaces of the wire electrode perpendicularity gage contact the wire electrode when the one wire guide is positioned in the third position u3, moving the one wire guide in the direction with the wire guide drive mechanism to position the one wire guide in a fourth position u4 which is farther from the plane than the third position u3, moving the workpiece table along the one of the X axis and the Y axis with the workpiece drive mechanism to determine, with the detecting means, a fourth position x4 in which the detecting surfaces of the wire electrode perpendicularity gage contact the wire electrode when the one wire guide is positioned in the fourth position u4, computing a distance a between the one wire guide and an end of the detecting surface which is closer to the one wire guide and a distance b between the other wire guide and an end od the detecting surface which is closer to the other wire guide, based on a distance U1 between the positions u1 and u2, a distance U3 between the positions u3 and u4, a distance X1 between the positions x1 and x2, a distance x3 between the positions x3 and x4, and a measured distance h between the ends of the detecting surfaces, computing either a distance ti from one ui of the positions u1, u2, u3, u4 to the plane including the line uv - O, or a distance tj=(Ui−ti) from another position uj, which is spaced from the one position ui and across the plane by a distance Ui, to the plane, based on the distances a, b, h and one Xi of the distances between the positions x1, x2, x3, x4 which corresponds to the distance Ui, controlling the wire guide drive mechanism based on the computed distance ti or tj to orient the wire electrode perpendicularly to the reference machining plane with respect to the one of the U axis and the V axis, moving the one wire guide in a direction along the other of the V axis and the U axis with the wire guide drive mechanism to position the one wire guide in a first position u1 spaced from a plane which includes a line uv - O passing through the other wire guide and directing normal to the reference machine plane and which is perpendicular to the direction, while holding the one wire guide in a vertically adjusted position, moving the workpiece table along the other of the Y axis and the X axis which extends parallel to the direction, with the workpiece drive mechanism, to determine, with the detecting means, a first position x1 in which the detecting surfaces of the wire electrode perpendicularity gage contact the wire electrode when the one wire guide is positioned in the first position u1, moving the one wire guide in the direction with the wire guide drive mechanism to position the one wire guide in a second position u2 which is closer to the plane than the first position u1, moving the workpiece table along the other of the Y axis and the X axis with the workpiece drive mechanism to determine, with the detecting means, a second position x2 in which the detecting surfaces of the wire electrode perpendicularity gage contact the wire electrode when the one wire guide is positioned in the second position u2, positioning the one wire guide in a third position u3 which is spaced from the plane on a side thereof opposite to the second position u2, moving the workpiece table along the other of the Y axis and the X axis, with the workpiece drive mechanism, to determine, with the detecting means, a third position x3 in which the detecting surfaces of the wire electrode perpendicularity gage contact the wire electrode when the one wire guide is positioned in the third position u3, moving the one wire guide in the direction with the wire guide drive mechanism to position the one wire guide in a fourth position u4 which is farther from the plane than the third position u3, moving the workpiece table along the other of the Y axis and the X axis with the workpiece drive mechanism to determine, with the detecting means, a fourth position x4 in which the detecting surfaces of the wire electrode perpendicularity gage contact the wire electrode when the one wire guide is positioned in the fourth position u4, computing a distance a between the one wire guide and an end of the detecting surface which is closer to the one wire guide and a distance b between the other wire guide and an end of the detecting surface which is closer to the other wire guide, based on a distance U1 between the positions u1 and u2, a distance U3 between the positions u3 and u4, a distance X1 between the positions x1 and x2, a distance X3 between the positions x3 and x4, and a measured distance h between the ends of the detecting surfaces, computing either a distance ti from one ui of the positions u1, u2, u3, u4 to the plane including the line uv - O, or a distance tj=(Ui−ti) from another position uj, which is spaced from the one position ui and across the plane by a distance Ui, to the plane, based on the distances a, b, h and one Xi of the distances between the positions x1, x2, x3, x4 which corresponds to the distance Ui, and controlling the wire guide drive mechanism based on the computed distance ti or tj to orient the wire electrode perpendicularly to the reference machining plane with respect to the other of the V axis and the U axis. In the above described method, all of the steps are repeated at least twice. Further, the above described method further including the steps of after the wire electrode is oriented perpendicularly to the reference machining plane with respect to both the U- and the V-axes, determining arithmetic means of the last computed distances a, b with respect to both the U- and V-axes, and using the arithmetic means as data for a subsequent machining process.

According to the method of the present invention, one of the wire guides is positioned successively in the four positions, and the workpiece table is moved each time the one wire guide is positioned in one of the four positions, to determine positions in which the detecting surfaces of the wire electrode perpendicularity gage contact the wire electrode at the time the one wire guide is positioned in the respective four positions. The distances a, b between the wire guides and the ends, closer thereto, of the detecting surfaces of the wire electrode perpendicularity gage are computed on the basis of data relative to the positions in which the one wire guide is positioned and data relative to the positions in which the detecting surfaces contact the wire electrode, and also based on the distance h between the ends of the detecting surfaces. The moving distance which the one wire guide has to traverse to orient the wire electrode perpendicularly to the reference machining plane is computed on a primary basis of the computed distances a, b. Then, the one wire guide is moved on the basis of the computed distance. Therefore, the wire electrode can be directed perpendicularly to the reference machine plane highly accurately within a short period of time. The accurate perpendicular orientation of the wire electrode is attainable at all times without being adversely affected by shape and dimensional irregularities of the wire guides.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

Figure 1:
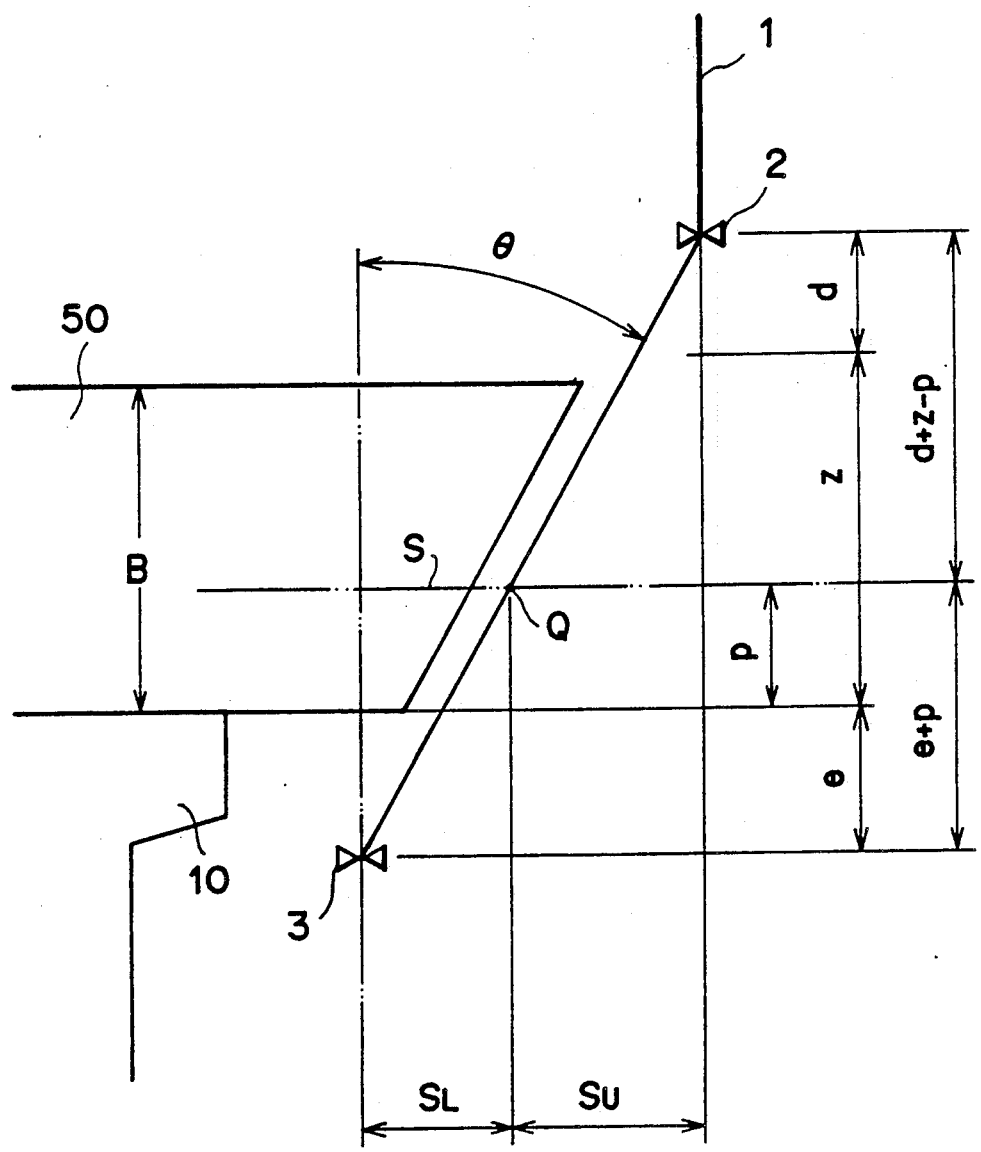
FIG. 1 is a diagram showing a tapered surface machining process to be effected on a workpiece.

Illustrated in FIG. 1 is a tapered surface machining process which is frequently effected by an electrical-discharge wire cutting machine. As shown in FIG. 1, a workpiece 50 having a thickness B is mounted on a workpiece table 10, and a programmed plane S in which a machining path is instructed is given by a distance p above the upper surface of the workpiece table 10 on which the workpiece 50 is mounted. In order to machine the workpiece 50 to generate a tapered surface with an inclination at an angle of $\theta$ with respect to the vertical plane, it is necessary to determine a horizontal distance $S_U$ between an upper wire guide 2 and a point Q of intersection between the programmed plane S and a wire electrode 1, and a horizontal distance $S_L$ between a lower wire guide 3 and the intersecting point Q.

These distances $S_U$, $S_L$ are computed according to the following equations:

$$S_U = (d+z-p) \tan \theta \qquad (1)$$

$$S_L = (e+p) \tan \theta \qquad (2)$$

where e is the distance between the lower wire guide 3 and the upper surface of the workpiece table 10, z is the amount of vertical adjustment of the upper wire guide 2 for machining, d is the distance between the upper wire guide 2 and the upper surface of the workpiece table 10 when the amount z of vertical adjustment is zero, and p is the distance between the programmed plane S and the upper surface of the workpiece table 10.

In the above equations (1) and (2), the parameter p is of a value which can freely be selected by the operator, and the parameter z varies with the thickness of the workpiece 50. The value of the parameter z can be read from a device which vertically adjusts the upper wire guide 2. The values of the parameters d and e have to be accurately measured for each machining process because the upper and lower wire guides have shape and dimensional irregularities.

The parameters d, e are referred herein to as a true upper wire guide span and a true lower wire guide span, respectively.

Figure 2:
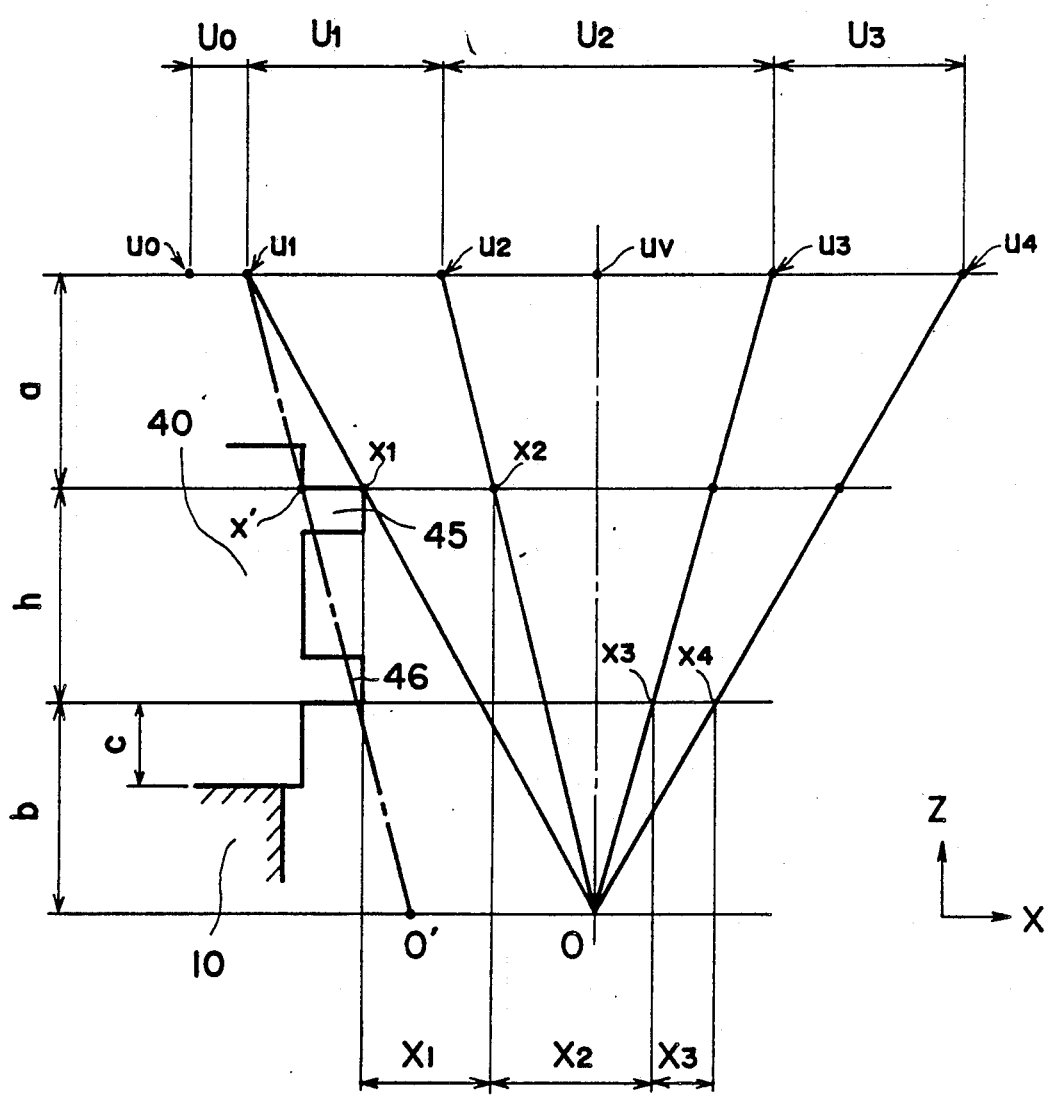
FIG. 2 is a diagram showing the principles of measurement of wire guide spans based on the movement of an upper wire guide with respect to a lower wire guide.

These wire guide spans d, e are related respectively to the distance a between the upper wire guide 2 and the upper end of an upper detector 45 (FIG. 2) of a wire electrode perpendicularity gage 40 which is closer to the upper wire guide 2, and the distance b between the lower wire guide 3 and the lower end of a lower detector 46 of the wire electrode perpendicularity gage 40 which is closer to the lower wire guide 3, as follows:

$$d = a + h + c - z$$

$$e = b - c$$

where h is the distance between the upper and lower ends 45, 46 of the detecting surface of the wire electrode perpendicularity gage 40, and c is the height from the upper surface of the workpiece table 10 to the lower end 46 of the detecting surface of the wire electrode perpendicularity gage 40, as shown in FIG. 2. The values of h, c are inherent in the wire electrode perpendicularity gage 40 which is used.

The values of the true wire guide spans d, e can therefore be determined easily from the values of the distances a, b.

The distances a, b will also be referred to as upper and lower wire guide spans for an easier understanding of the present invention.

A process for the computation of wire guide spans will be described below with reference to FIG. 2.

In FIG. 2, the upper wire guide 2 which is movable can be positioned in four positions u1, u2, u3, u4. The positions u1, u2 and the positions u3, u4 are disposed on opposite sides of a position uv where the wire electrode is directed vertically or perpendicularly to the reference machining plane. The wire electrode perpendicularity gage 40 can contact the wire electrode in positions x1, x2, x3, x4 when the upper wire guide is positioned in the respective positions u1, u2, u3, u4. More specifically, the upper end of the upper detector 45 of the wire electrode perpendicularity gage 40 contacts the wire electrode in the positions x1, x2 when the upper wire guide is positioned in the positions u1, u2, respectively, and the lower end of the lower detector 46 of the gage 40 contacts the wire electrode in the positions x3, x4 when the upper wire guide is positioned in the positions u3, u4, respectively. The distances between the positions u1 and u2, between u2 and u3, and between u3 and u4 are indicated by U1, U2, U3, and the horizontal distances between the positions x1 and x2, between x2 and x3, and between x3 and x4 are indicated by X1, X2, X3, respectively. The lower wire guide is fixed in a position O.

An auxiliary line is drawn which passes the position u1 and is in parallel to a line segment u2 - O that connects the positions u2, O. The auxiliary line and a line which passes through the position O and is in parallel to a line connecting the positions u1 through u4 intersect at a point O'. The auxiliary line and an extension of a line connecting the positions x1 through x4 intersect at a point x'. Comparison between triangles u1-O'-O and u1-x'-x1 results in the following equation:

$$U1 : (a+h+b) = (U1-X1) : a \qquad (3)$$

Comparison between triangles u3-O-u4 and x3-O-x4 results in the following equation:

$$U3 : (a+h+b) = X3 : b \qquad (4)$$

From the above equations (3) and (4), there are derived the following equations:

$$a\ U1 = (U1-X1)(a+h+b) \qquad (5)$$

$$U3\ b = X3\ (a+h+b) \qquad (6)$$

The equation (5) can be rewritten as:

$$a = [(U1-X1)(h+b)]/X1 \qquad (7)$$

By substituting the equation (7) in the equation (6), we obtain the following equation:

$$U3\ b = [X3\ U1(h+b)]/X1 \qquad (8)$$

The equation (8) can be rewritten as:

$$b = U1\ h\ X3/(U3\ X1 - U1\ X3) \qquad (9)$$

From the equations (7) and (9), the following equation is given:

$$a = U3\ h\ (U1-X1)/(U3\ X1 - U1\ X3) \qquad (10)$$

As is apparent from the equations (9) and (10) above, the values of the parameters a, b can be computed on the basis of the values of the five parameters, i.e., h, U1, U3, X1, and X3.

Next, a process for computing the moving distance which the upper wire guide is required to traverse in order to direct the wire electrode perpendicularly to the reference machining plane will be described below with reference to FIG. 3.

Figure 3:
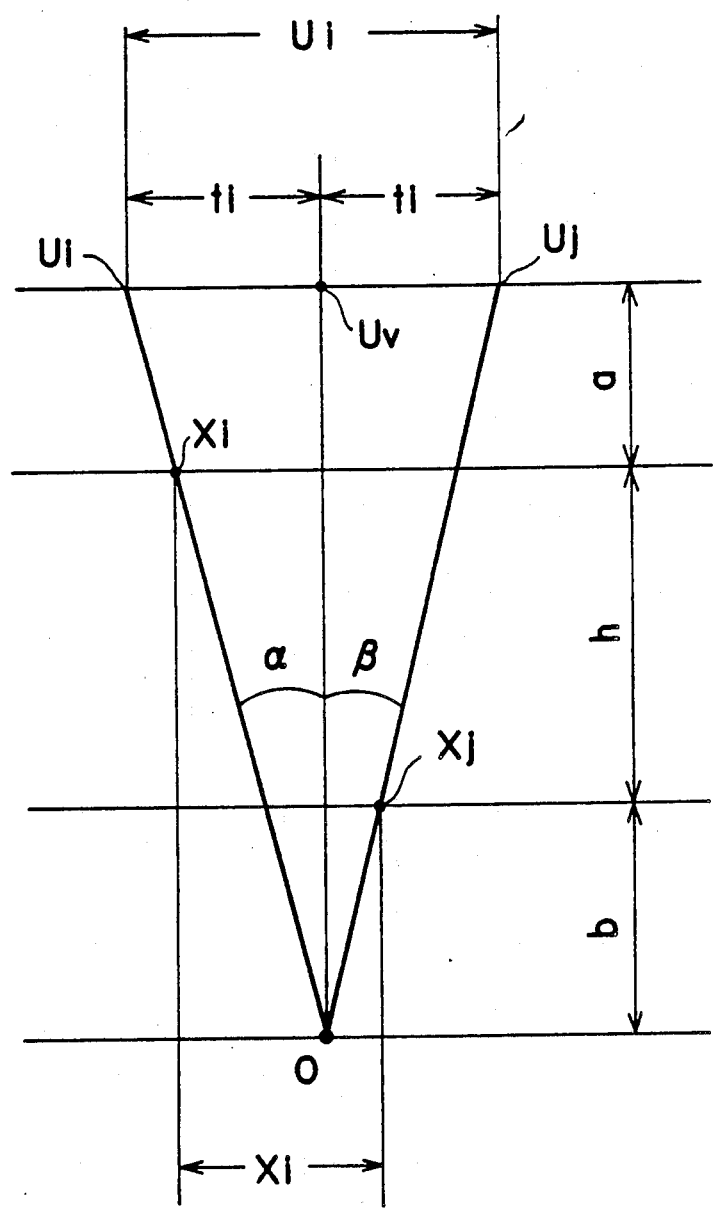
FIG. 3 is a diagram showing the principles of computation of the distance which the upper wire guide has to move for directing a wire electrode perpendicularly to a reference machining plane.

As shown in FIG. 3, the plane in which the upper wire guide moves and a line vertically extending upwardly from the lower wire guide position O intersects at a point uv. The upper wire guide can be positioned in two positions ui, uj, one on each side of the point uv. When the upper wire guide is located in these positions ui, uj, the wire electrode contacts the wire electrode perpendicularity gage at respective positions xi, xj. Angles ui-O-uv and uj-O-uv are indicated respectively by $\alpha$, $\beta$. The distance ti from the point uv to the position ui, the distance Ui between the positions ui and uj, and the distance Xi between the positions xi and xj are expressed by the following equations:

$$ti = (a+h+b) \tan \alpha \quad (11)$$

$$Ui = (a+h+b) \tan \alpha + (a+h+b) \tan \beta \quad (12)$$

$$Xi = (h+b) \tan \alpha + b \tan \beta \quad (13)$$

The equation (13) can be rewritten as:

$$\tan \beta = [Xi - (h-b) \tan \alpha]/b \quad (14)$$

By substituting the equation (14) in the equation (12), we obtain:

$$Ui = (a+h+b)(\tan \alpha + Xi/b - h \tan \alpha/b - \tan \alpha) \quad (15)$$

From the equation (15), the following equation is derived:

$$\tan \alpha = [(a+h+b) Xi - b\ Ui]/(a+h+b)\ h \quad (16)$$

By substituting the equation (16) in the equation (11), we obtain the distance ti as follows:

$$ti = b(Xi - Ui)/h + a\ Xi/h + Xi \quad (17)$$

Therefore, the distance ti between the point uv and the position ui, which may be one of the four positions u1, u2, u3, u4 (FIG. 2), can be computed according to the equation (17) on the basis of the distance Ui between the positions ui and uj, the distance Xi between the positions xi and xj, the values of the parameters a, b which are computed according to the equations (9) and (10) above, and the measured distance h between the upper and lower ends of the detectors of the wire electrode perpendicularity gage.

As described above, one of the upper and lower wire guides (the upper wire guide in the above description) is positioned successively in four positions, two on each side of a position where the wire electrode is deemed to be held vertically, and the position where the wire electrode contacts the wire electrode perpendicularity gage is determined each time the wire guide is positioned in one of the four positions. Through such a process, the distances a, b between the upper and lower wire guides and the upper and lower ends of the detectors of the wire electrode perpendicularity gage can accurately be computed. The distance data a, b thus obtained can be used to calculate data required to hold the wire electrode perpendicularly to the reference machining plane. Accordingly, the wire electrode can be directed perpendicularly to the reference machining plane accurately in a relatively simple manner. Even when the wire guides are replaced with other wire guides, the wire electrode can be still directed perpendicularly to the reference machining plane highly accurately irrespective of dimensional irregularities of the newly assembled wire guides.

Figure 4:
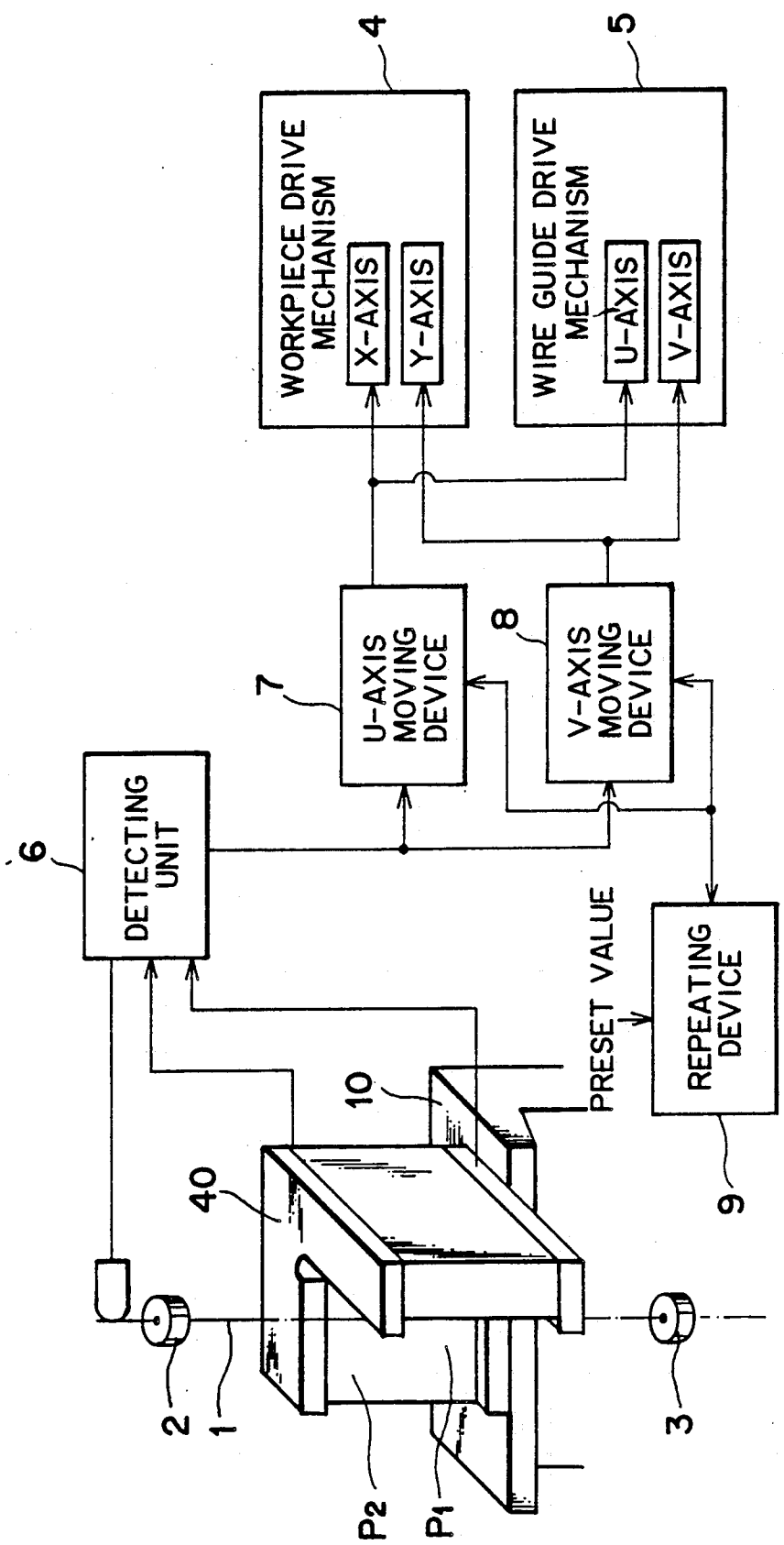
FIG. 4 is a schematic view, partly in block form, of an electrical-discharge wire cutting machine which is employed in the present invention.

FIG. 4 shows an electrical-discharge wire cutting machine in which the methods of the present invention may be carried out. The electrical-discharge wire cutting machine comprises a workpiece drive mechanism 4 for driving a workpiece along an X-axis and a Y-axis which extend perpendicularly to each other, a pair of upper and lower wire guides 2, 3 for guiding a wire electrode 1, one of the wire guides 2, 3 (the upper wire guide 2 in the embodiment) being horizontally movable and also vertically adjustable by a vertical position adjusting device (not shown), and a wire guide drive mechanism 5 for horizontally driving the upper wire guide 2 along a U-axis parallel to the X-axis and a V-axis parallel to the Y-axis. A wire electrode perpendicularity gage 40 is mounted on a workpiece table 10 and has two perpendicular detecting surfaces P1, P2. The electrical-discharge wire cutting machine also has a detecting unit 6 for receiving detected signals from the wire electrode perpendicularity gage 40, a pair of U- and V-axis moving devices 7, 8, and a repeating device 9 which is connected to the U- and V-axis moving devices 7, 8, for repeating a certain operational mode according to a preset value which is inputted.

Figure 5:
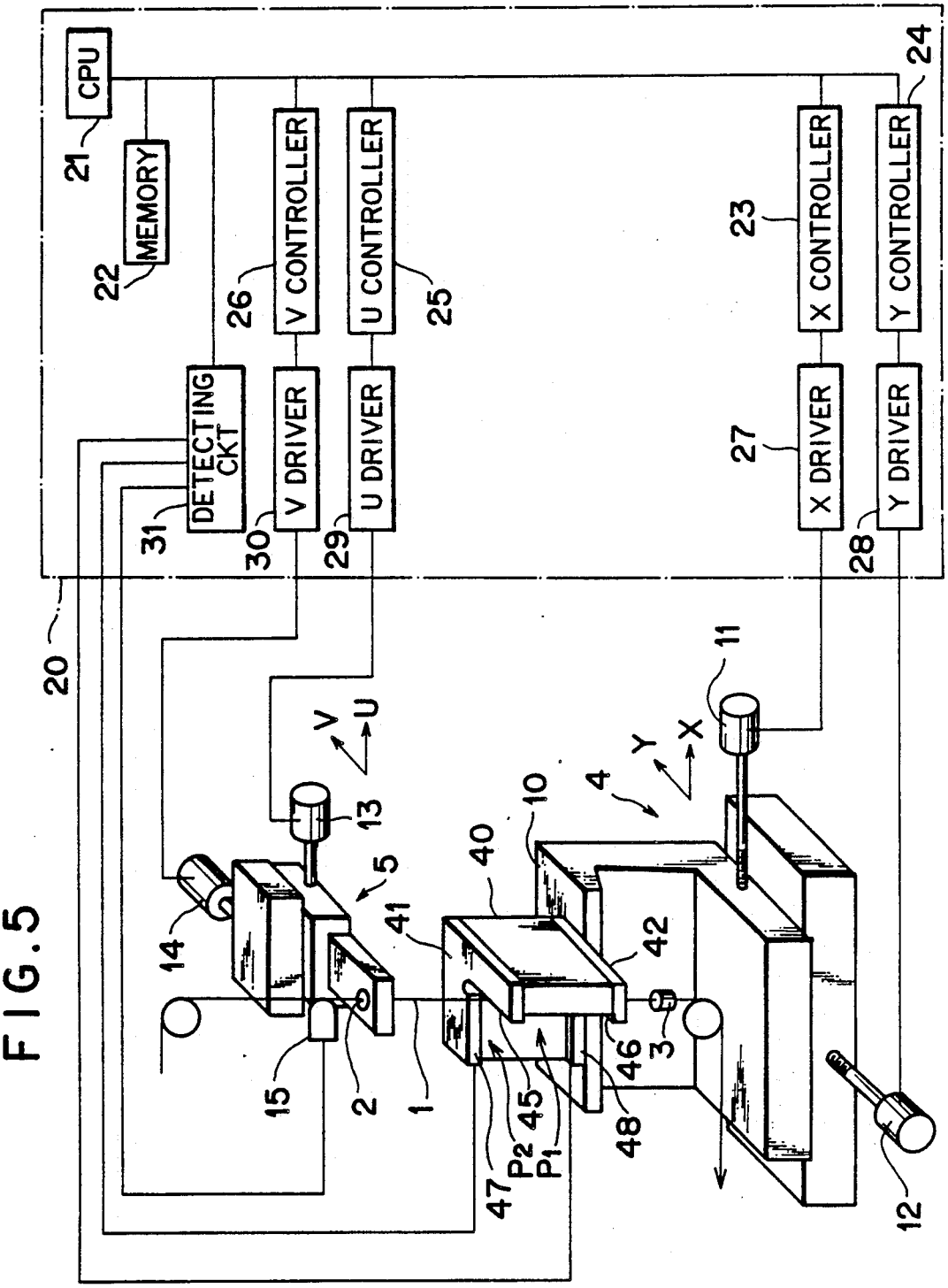
FIG. 5 is a detailed perspective view of the electrical-discharge wire cutting machine, the view also showing a control system in block form.

FIG. 5 shows the electrical-discharge wire cutting machine in greater detail.

In FIG. 5, the workpiece drive mechanism 4 comprises a feed mechanism including an X-axis motor 11 and a Y-axis motor 12 for moving the workpiece table 10 with the workpiece supported thereon, in the directions of the X-axis and the Y-axis. The wire electrode 1 is positioned by the upper and lower wire guides 2, 3 and guided thereby while traveling vertically, during which time the wire electrode 1 is being tensioned by a brake roller and a drive roller (not shown). the lower wire guide 3 is fixed in a given position. The upper wire guide 2 is positionally adjustable freely in a vertical direction (normal to a U-V plane) by the vertical position adjusting device (not shown). The wire guide drive mechanism 5 comprises a feed mechanism including an U-axis motor 13 and a V-axis motor 14 for moving the upper wire guide 2 in the directions of the U-axis and the V-axis, i.e., in the U-V plane parallel to the X-Y plane. The inclination angle of the wire electrode 1 is controlled depending on the position of the upper wire guide 2 in the U-V plane.

The electrical-discharge wire cutting machine also includes a numerical control (NC) system 20. The NC system 20 comprises a central processing unit (CPU) 21 (corresponding to a software of the repeating device shown in FIG. 4), a memory 22, X, Y, U, V controllers 23, 24, 25, 26 controlled by the CPU 21, and X, Y, U, V drivers 27, 28, 29, 30 controlled by the respective X, Y, U, V controllers 23 through 26. The motors 11, 12, 13, 14 are controlled respectively by the X, Y, U, V drivers 27 through 30. The controller 25 and the driver 29 correspond to the U-axis moving device 7 shown in FIG. 4, and the controller 26 and the driver 30 correspond to the V-axis moving device 8 shown in FIG. 4.

The NC system 20 also includes a detecting circuit 31 (corresponding to the detecting unit 6 shown in FIG. 4)

which is connected to the CPU 21 and receives detected signals from the wire electrode perpendicularity gage 40. More specifically, the first detecting surface p1 of the wire electrode perpendicularity gage 40 lies perpendicular to the X-axis and has upper and lower detectors 45, 46, and the second detecting surface P2 lies perpendicular to the Y-axis and has upper and lower detectors 47, 48. The detecting circuit 31 applies a low voltage ranging from 5 to 10 V between a feeder contact 15 held against the wire electrode 1 and the detectors 45 through 48. Therefore, when the wire electrode 1 contacts one or more of the detectors 45 through 48, the detecting circuit 31 can electrically detect the contact between the wire electrode 1 and the detectors 45 through 48. The detectors 45, 47 have an upper surface 41, and the detectors 46, 48 have a lower surface 42.

The U-axis and the V-axis have their own origins. When the upper wire guide 2 is positioned at the origins of the U-axis and the V-axis, origin signals are supplied to the NC system 20.

The CPU 21 executes an NC program and a computation program which are stored in the memory 22. According to the NC program and inputted information, the CPU 21 energizes and controls the motors 11 through 14, and stores, in the memory 22, positional information of these motors and contact position information based on the detected signals from the detecting circuit 31. According to the computation program, the CPU 21 calculates the distances between the wire guides 2, 3 and the upper and lower detectors of the gage 40 close thereto based on the stored positional information, contact position information and the provisionally measured distance h between the upper and lower detectors of the gage 40, and stores the computed distances in the memory 22.

Then, based on the stored information and computed data, the CPU 21 computes the moving distance which the upper wire guide 2 has to traverse to bring the wire electrode 1 perpendicularly to the reference machining plane, and actuates the wire guide drive mechanism 5 according to the computed distance to hold the wire electrode 1 perpendicularly to the reference machining plane.

Alternatives are available for the computation of the distances and the bringing of the wire electrode 1 perpendicularly to the reference machining plane with respect to the U-axis and the V-axis. According to one alternative, the distances between the wire guides and the detectors (wire guide spans) are computed with respect to the U-axis, and then the wire electrode is directed perpendicularly to the reference machining plane with respect to the U-axis. Thereafter, the wire guide spans are computed with respect to the V-axis, and then the wire electrode is directed perpendicularly to the reference machining plane with respect to the V-axis. According to another alternative, the wire guide spans are computed with respect to the U- and V-axes, then the computed wire guide spans are averaged, and thereafter the wire electrode is directed perpendicularly to the reference machining plane based on the average wire guide spans.

Figure 6:
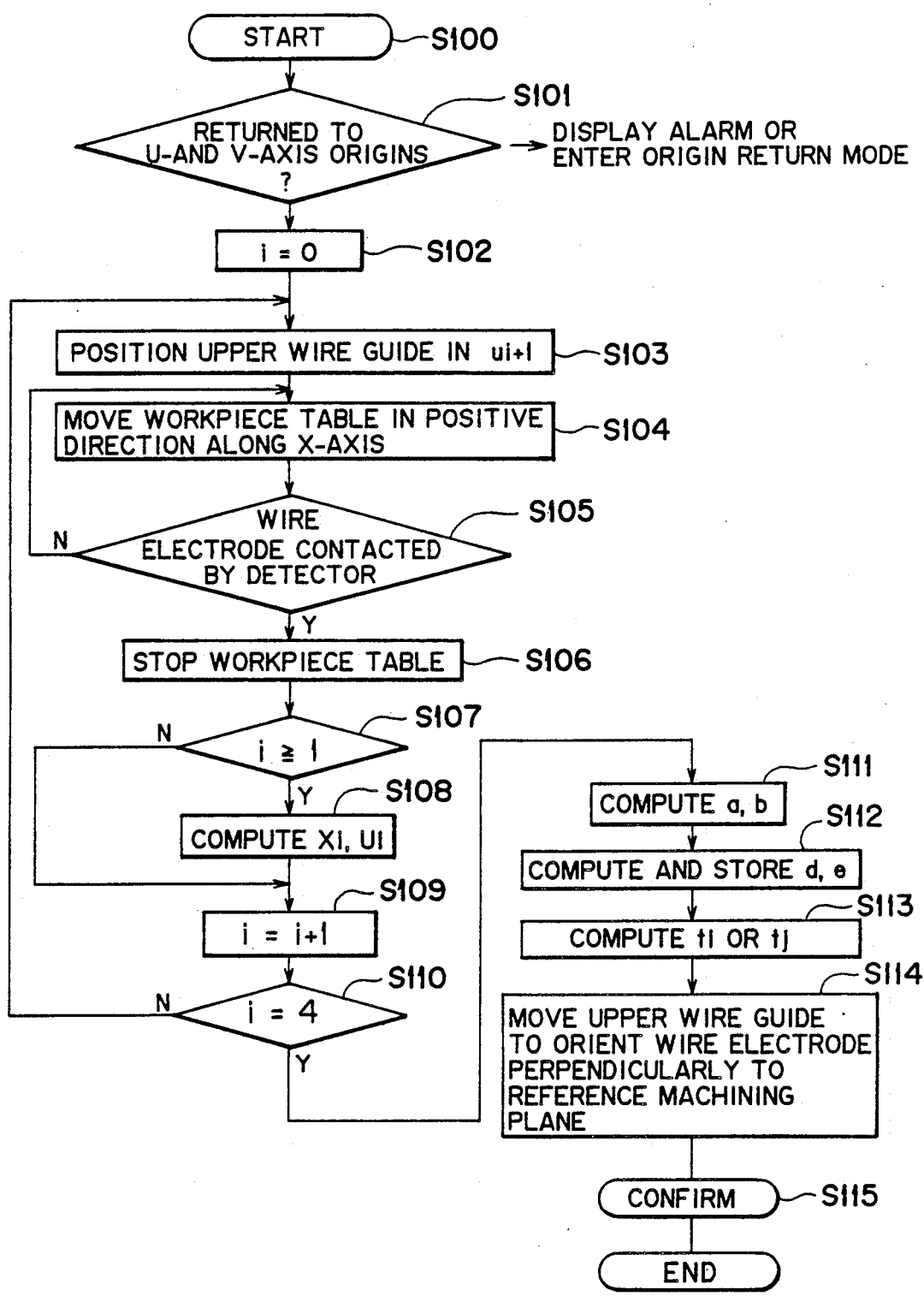
FIG. 6 is a flowchart of a processing sequence which is executed by a CPU in the control system for carrying out a method of the present invention.

FIG. 6 shows a flowchart of a processing sequence for the computation of distance data and perpendicular orientation of the wire electrode. A method of the present invention for directing the wire electrode perpendicularly to the reference machining plane will hereinafter be described with reference to the flowchart of FIG. 6 and also FIGS. 1 through 3.

When a command for measuring wire guide spans is given to the NC system 20 in a step S100, the CPU 21 determines whether the upper wire guide 2 has returned to the origins (indicated at uo in FIG. 2) of the U- and V-axes in a step S101. If the upper wire guide 2 has not returned to the origins, then the CPU 21 either displays an alarm, prompting the operator to select an origin return mode, or automatically enters the origin return mode in which the wire guide drive mechanism 5 is actuated to return the upper wire guide 2 to the origins of the u- and V-axes. Thereafter, a data item i is set to "0" in a step S102.

Then, the CPU 21 actuates the wire guide drive mechanism 5 to energize one of the motors 13, 14, for example, the U-axis motor 13, to displace the upper wire guide 2 to a position indicated by ui+1, i.e., to position the upper wire guide 2 in a position u1 which is spaced by a distance Uo (FIG. 2) from the origins uo, in a step S103. After the upper wire guide 2 is thus positioned, the CPU 21 operates the workpiece drive mechanism 4 to move the workpiece table 10 in a positive direction along the X-axis (i.e., rightwardly in FIG. 2) in a step S105. The workpiece table 10 is stopped when the wire electrode 1 is contacted by the upper end of the upper detector 45 in the position x1, and the position x1 is stored in a step S106. Then, the CPU 21 determines whether the item i is equal to or larger than "1", or not in a step S107. If not, the item i is incremented by "1" in a step S109, which is followed by a step S110 that determines whether the item i is equal to "4" or not. If not equal to "4", then the routine returns to the step S103, and repeats the steps S103 through S106. The upper wire guide 2 now moves from the position u1 to the position u2, and the workpiece table 10 moves from the position x1 to the position x2. The step S107 is carried out again. If the item i is equal to or more than "1", then the routine goes to a step S108 in which the following calculations are effected to find the distances Ui, Xi.

$$Ui = |ui+1 - ui|$$

$$Xi = |xi+1 - xi|$$

The above sequence is repeated until the item i becomes "4" in the step s110. If the item i is found to be "4", then the routine proceeds to a step S111. In the step S111, based on U1, U3, X1, X3 among the following data computed in the step S103:

$$U1 = |u2 - u1| \quad X1 = |x2 - x1|$$
$$U2 = |u3 - u2| \quad X2 = |x3 - x2|$$
$$U3 = |u4 - u3| \quad X3 = |x4 - x3|$$

and also based on the distance h, which has already been measured and inputted, between the upper surface 41 of the upper detector 45 and the lower surface 42 of the lower detector 46 of the wire electrode perpendicularity gage 40, the distance a between the upper wire guide 2 and the upper surface 41 of the upper detector 45 and the distance b between the lower wire guide 3 and the lower surface 42 of the lower detector 46 are computed according to the equations (10) and (9) given above. The computed distance data a, b are then stored in the memory 22.

Data required to effect a tapered surface machining process as shown in FIG. 1 are then computed. Such a tapered surface machining process is carried out on a workpiece 50 having a thickness B and mounted on the workpiece table 10, after the orientation of the wire electrode 1 perpendicular to the reference machining plane has been completed. As the data for the tapered surface machining process, the distance d from the upper wire guide 2 to the upper surface of the workpiece 50 at the time vertically adjusted interval z of the upper wire guide 2 is zero, and the distance e from the lower wire guide 3 to the lower surface of the workpiece 50 are computed in a step 112 according to the following equations:

$$d = a + h + c - z$$

$$e = b - c$$

Then, the routine goes to a step S113 in which computed is the distance ti or tj=(Ui−ti) for the upper wire guide 2 to traverse from any one ui of the four positions u1, u2, u3, u4 in order to direct the wire electrode 1 perpendicularly to the reference machining plane. More specifically, the distance ti is computed according to the equation (17) given above and in connection with FIG. 3. If the position ui from which to move the upper wire guide 2 is not one of the positions u1, u2, but one of the positions u3, u4, then the distance tj=(Ui−ti) is computed after the computation of the distance ti.

The CPU 21 controls in a step 114 the wire guide drive mechanism 5 to move the upper wire guide 2 to the position ui or to move the upper wire guide 2 from the position u4 by the distance ti or tj=(Ui−ti).

The process of directing the wire electrode 1 perpendicularly to the reference machining plane with respect to the U-axis is now completed. Then, the same process is effected with respect to the V-axis. Now, the wire electrode 1 is oriented perpendicularly to the reference machining plane with respect to both the U- and V-axes.

In the above illustrated embodiment, the wire guide spans a, b are computed with respect to the U-axis and then the wire electrode 1 is brought perpendicularly to the reference machining plane with respect to the U-axis, and thereafter the wire guide spans a, b are computed with respect to the V-axis and then the wire electrode 1 is brought perpendicularly to the reference machining plane with respect to the V-axis. However, according to the other alternative described above, the wire guide spans a, b may be computed with respect to the U-axis and then the wire guide spans a, b may be computed with respect to the V-axis, and the wire electrode 1 may thereafter be oriented perpendicularly to the reference machining plane based on the arithmetic means of the computed wire guide spans a, b.

The distances d, e may be computed on the basis of the arithmetic means of the distances a, b, and may be used for a subsequent tapered surface machining process.

The step S114 is followed by a step S115 in which the workpiece table 10 is moved toward the perpendicularly oriented wire electrode 1 by the workpiece drive mechanism 4 to determine whether the upper and lower detectors 45, 46 are simultaneously contacted by the wire electrode 1. If the upper and lower detectors 45, 46 are not simultaneously contacted by the wire electrode 1, then the routine may return to the step S102 to repeat the process shown in FIG. 6 while giving positions u1, u2, u3, u4 different from those of the previous four positions. Any further details of the step S115 and a return loop from the step S115 are omitted from the illustration in FIG. 6, since the process of the invention for orienting the wire electrode 1 perpendicularly to the reference machining plane is highly accurate and the step S115 may not necessarily be required.

According to the present invention, as described above, measurements of the upper and lower guide spans can be promptly carried out, that is, a distance between the upper wire guide and the upper detector and a distance between the lower wire guide and the lower detector can be promptly analyzed, and based on these distance data, moving length or distance of the upper wire guide can be computed for obtaining perpendicular orientation of the wire electrode relative to the reference plane. As a result of the computation, the wire guide drive mechanism is operated. Accordingly, highly accurate perpendicular orientation of the wire electrode is obtainable within a short period. This is effective for precedent step of taper machining as well as an ordinary wire electrical discharge machining.

While the invention has been described in detail and with reference to specific embodiments thereof, it would be apparent to those skilled in the art that various changes and modifications can be made therein without departing from the spirit and scope of the invention.

What is claimed is:

1. A method of measuring wire guide spans in an electrical-discharge wire cutting machine having a workpiece table movable in a reference machining plane, for supporting a workpiece fixedly thereon, two wire guides disposed upwardly and downwardly, respectively, of the workpiece, a wire electrode extending between and guided by the wire guides, for machining the workpiece, a workpiece drive mechanism for moving the workpiece table along X and Y axes which are perpendicular to each other, with respect to the wire electrode, a wire guide drive mechanism for moving one of said wire guides along a U axis parallel to the X axis and a V axis parallel to the Y axis, a wire electrode perpendicularity gage fixedly mounted on the workpiece table and having two detecting surfaces lying perpendicularly to each other, and detecting means for detecting contact between the detecting surfaces and the wire electrode, said method comprising the steps of:

moving said one wire guide in a direction along one of said U axis and said V axis with said wire guide drive mechanism to position said one wire guide successively in first two positions u2, u3, one on each side of a plane which includes a line uv - O passing through the other wire guide and normal to said reference machine plane and which is perpendicular to said direction, and also to position said one wire guide successively in second two positions u1, u4 which are outward of said positions u2, u3 with respect to said plane;

moving said workpiece table along one of said X axis and said Y axis which extends parallel to said direction, with said workpiece drive mechanism, each time said one wire guide is positioned in one of said positions u1, u2, u3, u4, to determine positions x1, x2, x3, x4 in which said detecting surfaces of the wire electrode perpendicularity gage contact said wire electrode when said one wire guide is positioned in the respective positions u1, u2, u3, u4;

determining a distance U1 between said positions u1 and u2, a distance U3 between said positions u3 and u4, a distance X1 between the positions x1 and x2, and a distance X3 between the positions x3 and x4; and computing a distance a between said one wire guide and an end of the detecting surface which is closer to said one wire guide and a distance b between said other wire guide and an end of the detecting surface which is closer to said other wire guide, based on said determined distances U1, U3, X1, X3 and a measured distance h between said ends of said detecting surfaces.

2. A method according to claim 1, further comprising the steps of:

moving said one wire guide in a direction along the other of said V axis and said U axis with said wire guide drive mechanism to position said one wire guide successively in first two positions u2, u3, one on each side of a plane which includes a line uv - O passing through the other wire guide and normal to said reference machine plane and which is perpendicular to said direction, and also to position said one wire guide successively in second two positions u1, u4 which are outward of said positions u2, u3 with respect to said plane;

moving said workpiece table along the other of said Y axis and said X axis which extends parallel to said direction, with said workpiece drive mechanism, each time said one wire guide is positioned in one of said positions u1, u2, u3, u4, to determine positions x1, x2, x3, x4 in which said detecting surfaces of the wire electrode perpendicularity gage contact said wire electrode when said one wire guide is positioned in the respective positions u1, u2, u3, u4;

determining a distance U1 between said positions u1 and u2, a distance U3 between said positions u3 and u4, a distance X1 between the positions x1 and x3, and a distance X3 between the positions x3 and x4;

computing a distance a between said one wire guide and an end of the detecting surface which is closer to said one wire guide and a distance b between said other wire guide and an end of the detecting surface which is closer to said other wire guide, based on said determined distances U1, U3, X1, X3 and a measured distance h between said ends of said detecting surfaces; and determining arithmetic means of the computed distances a, b with respect to both said U- and V-axes, and using said arithmetic means as the wire guide spans.

3. A method of directing a wire electrode perpendicularly to a reference machining plane in an electrical-discharge wire cutting machine having a workpiece table movable in the reference machining plane, for supporting a workpiece fixedly thereon, two wire guides disposed upwardly and downwardly, respectively, of the workpiece, a wire electrode extending between and guided by the wire guides, for machining the workpiece, a workpiece drive mechanism for moving the workpiece table along X and Y axes which are perpendicular to each other, with respect to the wire electrode, a wire guide drive mechanism for moving one of said wire guides along a U axis parallel to the X axis and a V axis parallel to the Y axis, said one wire guide being positionally adjustable perpendicularly to a plane in which said one wire guide is movable along said U axis and said V axis, a wire electrode perpendicularity gage fixedly mounted on the workpiece table and having two detecting surfaces lying perpendicularly to each other, and detecting means for detecting contact between the detecting surfaces and the wire electrode, said method comprising the steps of:

moving said one wire guide in a direction along one of said U axis and said V axis with said wire guide drive mechanism to position said one wire guide successively in first two positions u2, u3, one on each side of a plane which includes a line uv - O passing through the other wire guide and normal to said reference machine plane and which is perpendicular to said direction, and also to position the wire guide in second two positions u1, u4 which are outward of said positions u2, u3, with respect to said plane, while holding said one wire guide in a vertically adjusted position;

moving said workpiece table along one of said X axis and said Y axis which extends parallel to said direction, with said workpiece drive mechanism, each time said one wire guide is positioned in one of said positions u1, u2, u3, u4, to determine positions x1, x2, x3, x4 in which said detecting surfaces of the wire electrode perpendicularity gage contact said wire electrode when said one wire guide is positioned in the respective positions u1, u2, u3, u4;

computing a distance a between said one wire guide and an end of the detecting surface which is closer to said one wire guide and a distance b between said other wire guide and an end of the detecting surface which is closer to said other wire guide, based on a distance U1 between said positions u1 and u2, a distance U3 between said positions u3 and u4, a distance X1 between the positions x1 and x2, a distance X3 between the positions x3 and x4, and a measured distance h between said ends of said detecting surfaces;

thereafter computing either a distance ti from one ui of said positions u1, u2, u3, u4 to said plane including said line uv - O, or a distance tj=(Ui−ti) from another position uj, which is spaced from said one position ui across said plane by a distance Ui, to said plane, based on said distances a, b, h and one Xi of the distances between said positions x1, x2, x3, x4 which corresponds to said distance Ui;

controlling said wire guide drive mechanism based on said computed distance ti or tj to orient said wire electrode perpendicularly to said reference machining plane with respect to said one of the U axis and the V axis;

moving said one wire guide in a direction along the other of said V axis and said U axis with said wire guide drive mechanism to position said one wire guide successively in first two positions u2, u3, one on each side of a plane which includes a line uv - O passing through the other wire guide and normal to said reference machine plane and which is perpendicular to said direction, and also to position the wire guide in second two positions u1, u4 which are outward of said positions u2, u3, with respect to said plane, while holding said one wire guide in a vertically adjusted position;

moving said workpiece table along the other of said Y axis and said X axis which extends parallel to said direction, with said workpiece drive mechanism, each time said one wire guide is positioned in one of said positions u1, u2, u3, u4, to determine positions x1, x2, x3, x4 in which said detecting surfaces of the wire electrode perpendicularity gage contact said wire electrode when said one wire guide is positioned in the respective positions u1, u2, u3, u4;

computing a distance a between said one wire guide and an end of the detecting surface which is closer to said one wire guide and a distance b between said other wire guide and an end of the detecting surface which is closer to said other wire guide, based on a distance U1 between said positions u1 and u2, a distance U3 between said positions u3 and u4, a distance X1 between the positions x1 and x3, a distance X3 between the positions x3 and x4, and a measured distance h between said ends of said detecting surfaces;

thereafter computing either a distance ti from one ui of said positions u1, u2, u3, u4 to said plane including said line uv - O, or a distance tj = (Ui − ti) from another position uj, which is spaced from said one positions ui across said plane by a distance Ui, to said plane, based on said distances a, b, h and one Xi of the distances between said positions x1, x2, x3, x4 which corresponds to said distance Ui; and controlling said wire guide drive mechanism based on said computed distance ti or tj to orient said wire electrode perpendicularly to said reference machining plane with respect to said other of the V axis and the U axis.

4. A method according to claim 3, wherein all said steps are repeated at least twice.

5. A method according to claim 3, further comprising the steps of:

after said wire electrode is oriented perpendicularly to said reference machining plane with respect to both said U- and said V-axes, determining arithmetic means of the last computed distances a, b with respect to both said U- and V-axes; and using said arithmetic means as data for a subsequent machining process.

6. A method of directing wire electrode perpendicularly to a reference machining plane in an electrical-discharge wire cutting machine having a workpiece table movable in the reference machining plane, for supporting a workpiece fixedly thereon, two wire guides disposed upwardly and downwardly, respectively, of the workpiece, a wire electrode extending between and guided by the wire guides, for machining the workpiece, a workpiece driving mechanism for moving the workpiece table along X and Y axes which are perpendicular to each other, with respect to the wire electrode, a wire guide drive mechanism for moving one of said wire guides along a U axis parallel to the X axis and a V axis parallel to the Y axis, said one wire guide being positionally adjustable perpendicularly to a plane in which said one wire guide is movable along said U axis and said V axis, a wire electrode perpendicularity gage fixedly mounted on the workpiece table and having two detecting surfaces lying perpendicularly to each other, and detecting means for detecting contact between the detecting surfaces and the wire electrode, said method comprising the steps of:

moving said one wire guide in a direction along one of said U axis and said V axis with said wire guide drive mechanism to position said one wire guide in a first position u1 spaced away from a plane which includes a line uv - O passing through the other wire guide and directing normal to said reference machine plane and which is perpendicular to said direction, while holding said one wire guide in a vertically adjusted position;

moving said workpiece table along one of said X axis and said Y axis which extends parallel to said direction, with said workpiece drive mechanism, to determine, with said detecting means, a first position x1 in which said detecting surfaces of the wire electrode perpendicularity gage contact said wire electrode when said one wire guide is positioned in the first position u1;

moving said one wire guide in said direction with said wire guide drive mechanism to position said one wire guide in a second position u2 which is closer to said plane than said first position u1;

moving said workpiece table along said one of said X axis and said Y axis with said workpiece drive mechanism to determine, with said detecting means, a second position x2 in which said detecting surfaces of the wire electrode perpendicularity gage contact said wire electrode when said one wire guide is positioned in the second position u2;

positioning said one wire guide in a third position u3 which is spaced from said plane on a side thereof opposite to said second position u2;

moving said workpiece table along said one of said X axis and said Y axis, with said workpiece drive mechanism, to determine, with said detecting means, a third position x3 in which said detecting surfaces of the wire electrode perpendicularity gage contact said wire electrode when said one wire guide is positioned in the third position u3;

moving said one wire guide in said direction with said wire guide drive mechanism to position said one wire guide in a fourth position u4 which is farther from said plane than said third position u3;

moving said workpiece table along said one of said X axis and said Y axis with said workpiece drive mechanism to determine, with said detecting means, a fourth position x4 in which said detecting surfaces of the wire electrode perpendicularity gage contact said wire electrode when said one wire guide is positioned in the fourth position u4;

computing a distance a between said one wire guide and an end of the detecting surface which is closer to said one wire guide and a distance b between said other wire guide and an end of the detecting surface which is closer to said other wire guide, based on a distance U1 between said positions u1 and u2, a distance U3 between said positions u3 and u4, a distance X1 between the positions x1 and x2, a distance x3 between the positions x3 and x4, and a measured distance h between said ends of said detecting surfaces;

computing either a distance ti from one ui of said positions u1, u2, u3, u4 to said plane including said line uv - O, or a distance tj = (Ui − ti) from another position uj, which is spaced from said one position ui and across said plane by a distance Ui, to said plane, based on said distances a, b, h and one Xi of the distances between said positions x1, x2, x3, x4 which corresponds to said distance Ui;

controlling said wire guide drive mechanism based on said computed distance ti or tj to orient said wire electrode perpendicularly to said reference machining plane with respect to said one of the U axis and the V axis;

moving said one wire guide in a direction along the other of said V axis and said U axis with said wire guide drive mechanism to position said one wire guide in a first position u1 spaced from a plane which includes a line uv - O passing through the other wire guide and directing normal to said reference machine plane and which is perpendicular to said direction, while holding said one wire guide in a vertically adjusted position;

moving said workpiece table along the other of said Y axis and said X axis which extends parallel to said direction, with said workpiece drive mechanism, to determine, with said detecting means, a first position x1 in which said detecting surfaces of the wire electrode perpendicularity gage contact said wire electrode when said one wire guide is positioned in the first position u1;

moving said one wire guide in said direction with said wire guide drive mechanism to position said one wire guide in a second position u2 which is closer to said plane than said first position u1;

moving said workpiece table along said other of said Y axis and said X axis with said workpiece drive mechanism to determine, with said detecting means, a second position x2 in which said detecting surfaces of the wire electrode perpendicularity gage contact said wire electrode when said one wire guide is positioned in the second position u2;

positioning said one wire guide in a third position u3 which is spaced from said plane on a side thereof opposite to said second position u2;

moving said workpiece table along said other of said Y axis and said X axis, with said workpiece drive mechanism, to determine, with said detecting means, a third position x3 in which said detecting surfaces of the wire electrode perpendicularity gage contact said wire electrode when said one wire guide is positioned in the third position u3;

moving said one wire guide in said direction with said wire guide drive mechanism to position said one wire guide in a fourth position u4 which is farther from said plane than said third position u3;

moving said workpiece table along said other of said Y axis and said X axis with said workpiece drive mechanism to determine, with said detecting means, a fourth position x4 in which said detecting surfaces of the wire electrode perpendicularity gage contact said wire electrode when said one wire guide is positioned in the fourth position u4;

computing a distance a between said one wire guide and an end of the detecting surface which is closer to said one wire guide and a distance b between said other wire guide and an end of the detecting surface which is closer to said other wire guide, based on a distance U1 between said positions u1 and u2, a distance U3 between said positions u3 and u4, a distance X1 between the positions x1 and x2, a distance X3 between the positions x3 and x4, and a measured distance h between said ends of said detecting surfaces;

computing either a distance ti from one ui of said positions u1, u2, u3, u4 to said plane including said line uv - O, or a distance $tj = (Ui - ti)$ from another position uj, which is spaced from said one position ui and across said plane by a distance Ui, to said plane, based on said distances a, b, h and one Xi of the distances between said positions x1, x2, x3, x4 which corresponds to said distance Ui; and controlling said wire guide drive mechanism based on said computed distance ti or tj to orient said wire electrode perpendicularly to said reference machining plane with respect to said other of the V axis and the U axis.

7. A method according to claim 6, wherein all said steps are repeated at least twice.

8. A method according to claim 6, further comprising the steps of:

after said wire electrode is oriented perpendicularly to said reference machining plane with respect to both said U- and said V-axes, determining arithmetic means of the last computed distances a, b with respect to both said U- and V-axes; and using said arithmetic means as data for a subsequent machining process.

* * * * *